United States Patent

[11] 3,627,316

[72] Inventor  Edward Machinski
              3715 N. Milbury Ave., Baldwin Park, Calif. 91706
[21] Appl. No. 797,113
[22] Filed     Feb. 6, 1969
[45] Patented  Dec. 14, 1971

[54] MAGNETIC FISHING GAME APPARATUS
     2 Claims, 8 Drawing Figs.
[52] U.S. Cl. .................................................. 273/1 M, 273/109, 273/140
[51] Int. Cl. .................................................. A63f 9/14
[50] Field of Search .................................. 273/1, 140, 109, 136 H; 272/19

[56]              References Cited
              UNITED STATES PATENTS
  732,312   6/1903   McLeod ..................... 273/109
3,085,802   4/1963   Yarashes .................. 273/136 H UX
2,261,709  11/1941   Wright ...................... 273/109
2,747,872   5/1956   Harvey ...................... 273/140 X
              FOREIGN PATENTS
1,027,847   1953     France ...................... 272/19

OTHER REFERENCES
"Playthings" magazine Aug. 1958 Vol. 56 no. 8. page 26

Primary Examiner—Anton O. Oechsle
Assistant Examiner—Paul E. Shapiro
Attorney—Boniard I. Brown ABSTRACT: Magnetic fishing game apparatus having a hollow game table simulating a fishing facility such as a pond and providing an internal chamber for containing one or more magnetic elements simulating fish, and a fishing implement having a magnetic element simulating a lure attached to one end of a line. The object of the game is to simulate catching a fish by initially maneuvering the lure to a position wherein a fish within the table chamber becomes magnetically attached to the lure and then drawing the lure and attached fish toward an opening in the upper wall or top of the table through which the fish may be pulled from the chamber by the lure. Features of the apparatus include a ramp below the opening for guiding the fish into the opening, a removable shield which permits the game to be played with the fish visible or hidden, a novel baffle arrangement which provides both a maze within and supports the upper plate of the game table, and a novel container for the table.

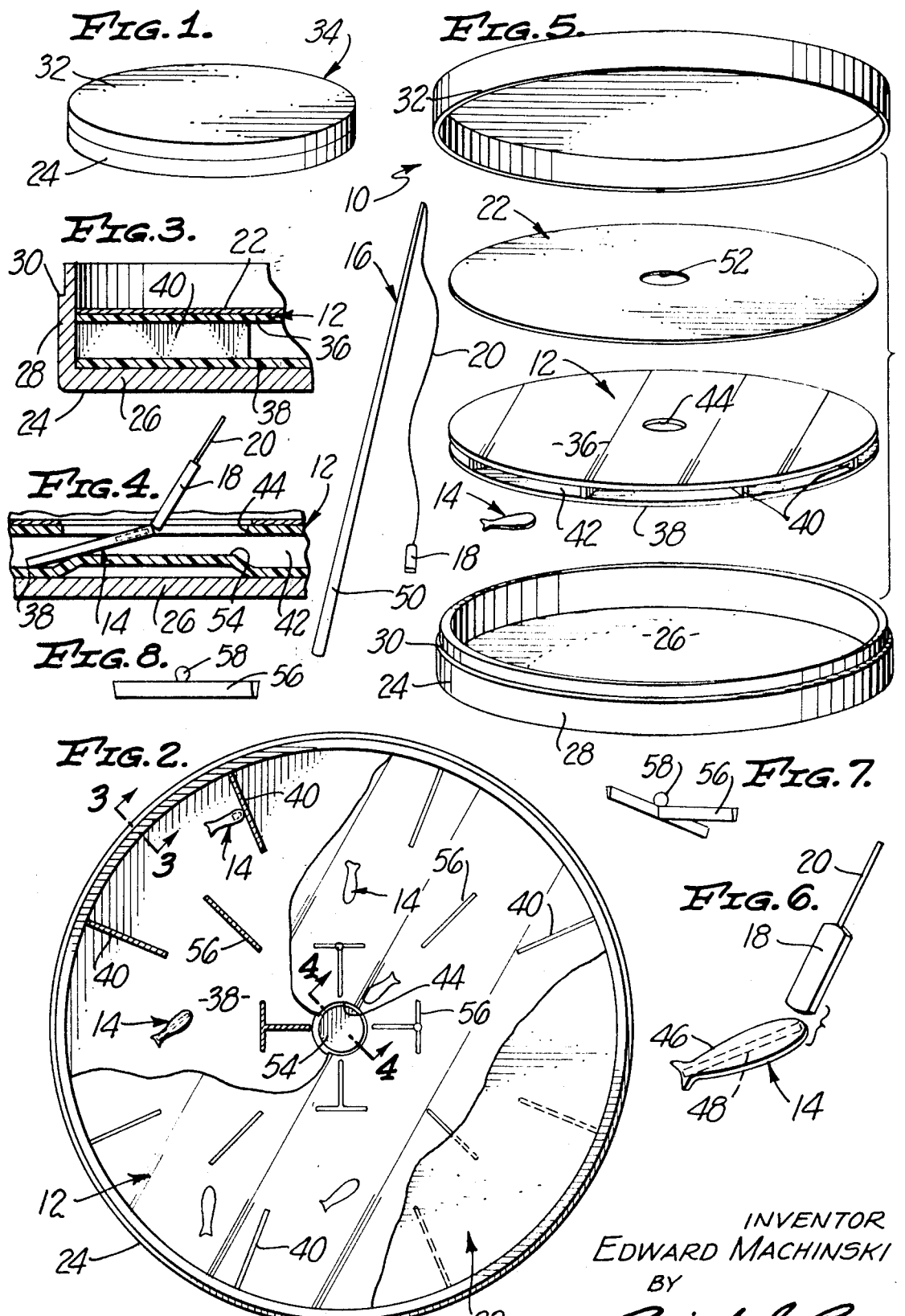

MAGNETIC FISHING GAME APPARATUS

BACKGROUND OF THE INVENTION

1. Field of the Invention

This invention relates generally to toys or amusement devices and more particularly to a novel magnetic fishing game apparatus.

2. Description of the Prior Art

Generally speaking, the present invention is concerned with fishing game apparatus having a hollow game table simulating a pond or other fishing facility and providing an internal chamber for containing one or more magnetic elements which are shaped to simulate fish. Such game apparatus is also equipped with a fishing implement having a magnetic element simulating a fishing lure attached to one end of a line. For convenience, the simulated fish and simulated lure will be hereinafter referred to, simply, as a fish and a lure, respectively. The object of this type of game is to simulate catching a fish by initially maneuvering the lure to a position wherein one of the fish within the game table becomes magnetically attached to the lure and then drawing the lure and its attached fish toward an opening in the table through which the fish may be pulled from the game table chamber by the lure. Fishing game devices of this general type are known in the art. U.S. Pat. No. 2,747,872, for example, discloses a typical fishing game device of this type.

SUMMARY OF THE INVENTION

The present invention provides an improved magnetic fishing game apparatus of the character described embodying certain unique features of construction which enhance the realism of the game, and thereby its player appeal, particularly to children. According to one feature of the invention, for example, a fish which is "caught" by magnetic attachment to the fishing lure is pulled from the game table chamber through an opening in the upper wall or top of the table in a manner realistically simulating pulling of a live fish from the water. This upper table wall may be transparent to simulate clear water and to expose the interior of the chamber. Alternatively, the top wall of the table may be translucent to simulate murky water or ice and to vaguely expose the interior of the chamber. According to another feature of the invention, a removable shield may be provided for placement over the top of the table to completely obscure its chamber and thereby render it more difficult to "catch" a fish. This shield has an opening which registers with the table opening. The bottom wall of the chamber may be provided with an annular inclined ramp formation for directing a fish attached to the lure upwardly through the table opening as the fish and lure are drawn toward the opening. This ramp formation also impedes inadvertent movement of the fish through the opening in the event the game board is tilted or otherwise moved about in the course of the game.

The present invention further provides baffles which are located at various positions within the game table chamber in a generally mazelike configuration. These baffles are intended to obstruct magnetic attachment of a lure to a fish as well as to impede removal of a fish with the lure and thereby further enhance the realism of the game. A further feature of the invention in this regard resides in the fact that the baffles are made adjustable and/or removable in such a way that the number and/or positions of the baffles may be changed to vary the skill required in playing the game. The present game apparatus may be equipped with a housing or container for holding the apparatus when not in use, thus to prevent loss of the fish and fishing implement. In the particular embodiment of the invention which has been selected for presentation in this disclosure, the housing serves the dual function of a supporting base for the game table.

BRIEF DESCRIPTION OF THE DRAWINGS

FIG. 1 is a perspective view of the container for the present game apparatus;

FIG. 2 is an enlarged plan view of the game apparatus with the top or lid of the container removed;

FIG. 3 is an enlarged section taken on line 3—3 in FIG. 2;

FIG. 4 is an enlarged section taken on line 4—4 in FIG. 2;

FIG. 5 is an exploded perspective view of the game apparatus;

FIG. 6 is a perspective view of a simulated fish and fishing lure of the game apparatus;

FIG. 7 is a perspective view of one of the adjustable baffles embodied in the game table; and FIG. 8 is a perspective view of another adjustable baffle embodied in the game apparatus.

DESCRIPTION OF THE PREFERRED EMBODIMENT

Referring now to these drawings, there is illustrated a fishing game apparatus 10 according to the invention. This game apparatus has four main components, to wit, a hollow game table 12 simulating a fish pond or other fishing facility, magnetic "fish" 14, a fishing implement 16 having a magnetic fishing "lure" 18 attached to one end of a line 20, and an opaque shield 22. The game table 12 has a base 24 in the form of a hollow container. This container has a bottom wall 26 surrounded by an upstanding rim 28. Rim 28 is externally recessed about its circumference at 30 to receive a lid 32. As will appear presently, the base 24 and lid 32 together constitute a container 34 for holding the game table 12, fish 14, fishing implement 16, and shield 22 when not in use.

The game 12 comprises a hollow table structure including a top plate 36 and a bottom plate 38. Plates 36 and 38 are retained in spaced relation by intervening baffles 40 so as to define between the plates a chamber 42. If desired, the baffles 40 may be permanently joined to both the top plate 36 and the bottom plate 38. Preferably, however, these baffles are joined to only one of the plates in order to permit the plates to be separated for reasons to be explained presently. Extending through the top plate 36 of the table is an opening 44 communicating to the table chamber 42.

The game table 12 is dimensioned to fit closely within the base 24 of the game container 34. In the particular game apparatus illustrated, the table and the base have generally circular disclike shapes. It will become readily evident as the description proceeds, however, that the table and container may have rectangular or other desired shapes. The game table 12 may be designed for removal from the container base 24 when in use. The illustrated game apparatus, however, is intended to be used with the table positioned within the base, as shown in FIG. 2. In this regard, it is significant to note that the base serves a threefold function in addition to its game storage function. One additional function of the base, for example, is to close the side openings of the table chamber 42 which opens through the edge of the table about its full circumference, as shown best in FIG. 5. The second additional function of the base is to retain the top and bottom table plates 36, 38 in their normal positions of alignment illustrated, wherein the plates are centered relative to one another, when these plates are not permanently joined by the intervening table ribs or baffles 40. Finally, as will be explained presently, the base serves the third additional function of centering the shield 22 relative to the game table when the shield is employed in the course of the fishing game.

The magnetic fish 14 are essentially identical although they may vary somewhat in appearance, if desired, so as to simulate different types of fish. Referring to FIG. 6, it will be observed that each fish has a body 46 which may be molded from plastic or otherwise formed. Fixed within the body is a magnetic element 48 which, as will be explained presently, may be a permanent magnet or a slug of magnetically permeable material. At the start of a fishing game, the fish 14 are placed within the chamber 42 of the game table 12 at random positions about the chamber in the manner illustrated in FIG. 2.

The fishing implement 16 has a slender rod 50 simulating a fishing pole. The fishing line 20 is attached at one end to one end of this rod or pole. The fishing lure 18 is attached to the opposite end of the line. Lure 18 comprises a magnetic element which may be either a permanent magnet or a slug of magnetically permeable material, depending upon the type of magnetic element embodied in the fish 14 and the manner in which the fish are intended to become magnetically attached to the lure. For example, the magnetic elements of both the fish and the lure may comprise permanent magnets which are polarized in such a way that the head end of the fish will be magnetically attracted to the lure. Alternatively, one of the elements may comprise a magnet and the other slug of magnetically permeable material so that either end of the fish will be magnetically attracted to the lure. Moreover, the baffles or ribs 40 within the game table 12 may be constructed of a magnetic material which will attract the fish 14 and/or the lure 18 for reasons to be explained presently.

When playing a fishing game with the present game apparatus 10, the fish 14 are placed at random positions within the chamber 42 of the game table 12, as shown in FIG. 2. The fishing lure 18 is placed on top of the table or within the table chamber and maneuvered about the table, either by moving the fishing pole 50 or tilting the table, in an attempt to "catch" a fish by magnetic attachment of the lure to a fish. The lure and fish are then pulled to the top opening 44 in the table 12, and the fish is pulled from the chamber through the opening in the manner illustrated in FIG. 4.

According to one unique feature of the present fishing game apparatus, the opening 44 through which the fish 14 are pulled from the chamber 42 in the game table 12 is located in the top wall or plate 36 of the table, rather than in the edge of the table as in the earlier mentioned prior art patent. Location of the opening in the top of the table offers the advantage of increasing the realism of the game, since pulling of the fish through this top opening more closely simulates the act of pulling a live fish from a body of water. In this regard, an additional feature of the invention resides in the fact that the top plate 36 of the table may comprise a clear or tinted transparent plastic or glass so as to simulate clear water, or a clear or tinted translucent plastic or glass to simulate murky water or ice. According to the latter feature then, the game apparatus may be designed to simulate either warm weather fishing in a pond of water or winter fishing through a hole in the ice surface of a frozen pond. If the top plate of the table is transparent, of course, the interior of the chamber 42 in the game table 12, and hence the fish 14 within the chamber, are readily visible to the players. If, on the other hand, the top plate is translucent, the fish may be visible to some degree or completely obscured, depending upon the opacity of the plate. Thus the skill required to "catch" a fish will depend, to some extent, upon the optical characteristics of the top plate.

According to the preferred practice of the invention, the top plate 36 of the game table 12 is constructed of a translucent plastic which is sufficiently transparent to render the fish 14 within the table chamber 42 at least vaguely visible to the players. In this case, the shield 22 may be employed to completely obscure the fish, when desired, to increase the skill required to "catch" a fish. To this end, the shield may comprise an opaque plastic sheet, or the like, which has substantially the same size and outline as the game table 12 so as to be adapted for placement within the container base 24, over the top plate 36 of the table. The shield has a central opening 52 which registers with the table opening 44 when the shield is in place. It is now evident that the container base 24 serves to retain the shield 22 in centered relation relative to the table 12, as noted earlier.

According to another feature of the invention, the bottom plate 38 of the game table 12 is provided with an upstanding annular tapered ramp formation 54 directly below the table opening 44. This ramp formation serves a twofold function. First, the ramp formation guides or deflects a fish 14 attached to the lure 18 upwardly through the table opening as the fish and lure are pulled toward this opening, as illustrated in FIG. 4, thus to facilitate entrance of the fish into and emergence of the fish through the opening. Secondly, the ramp formation inhibits inadvertent movement of the fish through the opening when the table is tilted or otherwise moved about, particularly in the course of the fishing game.

At this point, attention is again directed to the baffles or ribs 40 between the top and bottom plates 36, 38 of the game table 12. These baffles serve a dual function. First, the baffles retain the table plates in spaced relation so as to provide the chamber 42 between the plates. Secondly, the baffles are designed to obstruct magnetic attachment of the fish 14 to the lure 18 as well as removal of the fish from the chamber by the lure. In this regard, it will be recalled that the baffles may be constructed of a magnetic material which will attract either or both the fish and the lure, thus to enhance this obstruction function of the baffles. The baffles, then, lend realism to the fishing game by increasing the difficulty involved in "catching" a fish in the first place and thereafter pulling the fish from the table chamber 42 without separation of the fish from the lure.

According to another feature of the invention, the above-obstructing function of the baffles 40 may be augmented by arranging additional baffles 56 within the table chamber 42. The several baffles, then, provide a mazelike system of interconnecting passages within the chamber through which the lure 18 must be maneuvered and/or a fish 14 must be pulled by the lure. These additional baffles may have any desired shape and may be arranged in any desired pattern consistent with their intended function. Some or all of the baffles may be releasably or adjustably secured to one or both of the table plates 36, 38 in order to permit the orientation, position, and/or number of the baffles to be varied. This feature of the invention is desirable to prevent consistent winning of the fishing game by one player who becomes familiar with the location of the baffles. To this end, the baffles may be equipped with pins or detents 58 which are insertable, with a snug fit, within sockets within one or both plates. It is obvious, of course, that if the game table 12 has such an adjustable baffle arrangement, the top and bottom table plates 36, 38 must be capable of separation to expose the baffles for adjustment, removal, and replacement. On the other hand, if the table has a fixed baffle arrangement, the plates may be permanently joined to the baffles.

When the game apparatus 10 is not in use, the fish 14, fishing implement 16 and shield 22 are placed within the container base 24, along with the game table 12, and the lid 32 is placed on the base. The base, therefore, serves the dual function of a supporting base for the table and a storage container for the game apparatus when not in use.

While the invention has been disclosed in connection with a presently preferred embodiment thereof, it will be obvious to those versed in the art that various modifications of the invention are possible within the spirit and scope of the following claims.

What is claimed as new in support of Letters Patent is:

1. Fishing game apparatus comprising:
   a game table simulating a body of water such as a pond and including a removable upper plate and a lower plate, and a number of baffles between said plates and supporting said upper plate on and in spaced parallel relation to said lower plate so as to define a chamber between said plates,
   means securing said baffles to one plate including means whereby certain baffles may be adjusted and removed,
   a container base receiving said table including a rim rising above said upper plate to retain said plates in adjustment,
   said upper plate having an opening and said baffles being arranged to form a maze of passages leading to said opening,
   at least one simulated fish adapted to be positioned within said chamber,
   a simulated fishing implement including a line and a lure attached to one end of said line, and
   said fish and lure comprising magnetic elements having mutual magnetic attraction, whereby said fishing implement may be maneuvered to effect initial magnetic attachment of said lure to said fish and subsequent removal of said fish from said chamber through said table opening.

2. Fishing game apparatus comprising:

a game table simulating a body of water such as a pond and including spaced upper and lower plates defining therebetween an intervening chamber, said upper plate having an opening to said chamber, at least one simulated fish adapted to be positioned within said chamber, a simulated fishing implement including a line and a lure attached to one end of said line, said fish and lure comprising magnetic elements having mutual magnetic attraction, whereby said fishing implement may be maneuvered to effect initial magnetic attachment of said lure to said fish and subsequent removal of said fish from said chamber through said table opening, and an upstanding tapered ramp formation on said bottom plate directly below said table opening for directing said fish upwardly through said opening as said lure and fish are drawn toward and through said opening.

* * * * *